US011383646B2

(12) United States Patent
Lang et al.

(10) Patent No.: US 11,383,646 B2
(45) Date of Patent: Jul. 12, 2022

(54) VIEWING SYSTEM FOR A VEHICLE AND METHOD OF SWITCHING BETWEEN IMAGE AREAS DISPLAYED BY THE VIEWING SYSTEM

(71) Applicant: MEKRA Lang GmbH & Co. KG, Ergersheim (DE)

(72) Inventors: Werner Lang, Ergersheim (DE); Stefan Bauer, Gerhardshofen (DE); Andreas Enz, Burgbernheim (DE); Matthias Zink, Ohrenbach (DE)

(73) Assignee: MEKRA LANG GMBH & CO. KG, Ergersheim (DE)

( * ) Notice: Subject to any disclaimer, the term of this patent is extended or adjusted under 35 U.S.C. 154(b) by 0 days.

(21) Appl. No.: 17/207,153

(22) Filed: Mar. 19, 2021

(65) Prior Publication Data

US 2021/0291738 A1 Sep. 23, 2021

(30) Foreign Application Priority Data

Mar. 20, 2020 (DE) ...................... 10 2020 107 789.0

(51) Int. Cl.
*B60R 1/12* (2006.01)
*B60R 11/04* (2006.01)
*H04N 5/232* (2006.01)
*H04N 5/247* (2006.01)

(52) U.S. Cl.
CPC ............... *B60R 1/12* (2013.01); *B60R 11/04* (2013.01); *H04N 5/23293* (2013.01); *H04N 5/247* (2013.01); *B60R 2001/1253* (2013.01); *B60R 2300/105* (2013.01)

(58) Field of Classification Search
None
See application file for complete search history.

(56) References Cited

FOREIGN PATENT DOCUMENTS

| DE | 10 2010 032 411 A1 | 2/2012 | |
| DE | 102010032411 A1 * | 2/2012 | ............... B60R 1/00 |
| DE | 10 2015 218 033 A1 | 3/2017 | |
| DE | 102015218033 A1 * | 3/2017 | ............... B60R 1/00 |

OTHER PUBLICATIONS

German office action dated Oct. 19, 2020 issued in a corresponding application.

* cited by examiner

*Primary Examiner* — Edemio Navas, Jr.
(74) *Attorney, Agent, or Firm* — Cozen O'Connor

(57) ABSTRACT

A viewing system for a vehicle having a towing vehicle (5) and a trailer (6) pivotally mounted on the towing vehicle (5), with a first acquisition device (2a, 2b) for capturing first image data of a first area; a second acquisition device (3a, 3b) for capturing second image data of a second area overlapping the first area, wherein the first and second acquisition devices (2a, 2b, 3a, 3b) have different optical characteristics; a device (4a, 4b) for processing the first and second image data to extract first (7) and second (8) image areas; display (1a, 1b) for same-filed displaying the image areas; a pivot angle determining device to determine pivot angle between towing vehicle (5) and trailer (6); and a display switch for switching display of the first area and second area on a switching condition.

17 Claims, 9 Drawing Sheets

VIEWING SYSTEM FOR A VEHICLE AND METHOD OF SWITCHING BETWEEN IMAGE AREAS DISPLAYED BY THE VIEWING SYSTEM

BACKGROUND OF THE INVENTION

1. Field of the Invention

The invention relates to a viewing system for a vehicle and a method for switching between or crossfading image areas displayed by the viewing system, as well as a vehicle with a mirror replacement system which is the viewing system according to the present disclosure.

2. Description of the Related Art

Generally known viewing systems that use a main camera and, for example, a wide-angle camera are used, for example, as mirror replacement systems in vehicles. The main camera used in this case images a main acquisition area, and the wide-angle camera images a wide-angle acquisition area. According to UN/ECE-R46, for example, the main field of view represents a Group II field of view, and the wide-angle field of view represents a Group IV field of view, in order to provide the driver with vehicle-side fields of view and/or fields of view.

For certain driving situations, it is necessary to change the displayed field of view of the main camera in order to view other areas around the vehicle. An example of such a driving situation is a curve travel in which a trailer of the vehicle moves further into the main acquisition area, as a result of which the main acquisition area can display less or no longer any relevant surrounding information.

One problem in particular is that an aperture angle of the main camera is severely restricted in order to achieve the highest possible resolution, e.g. to meet the requirements of the aforementioned Group II field of view or to achieve the sharpest possible high-resolution image.

In special driving situations, such as the above mentioned curve travel, it is possible, especially in a viewing system using a main camera and a wide-angle camera provided on a vehicle with a pivoting trailer, that the limit of the acquisition area of the main camera is quickly reached and it is necessary to switch to the acquisition area of the wide-angle camera in order to display relevant information.

An object of the invention is to provide a viewing system, especially an indirect viewing system, which enables a driver of a vehicle with a towing vehicle and a trailer pivotably attached to the towing vehicle to perceive the vehicle surroundings, especially the rear trailer area, at any time by suitable switching between cameras having different optical properties.

A further object of the invention is to provide a method for switching between image areas on a display device of the viewing system in such a way that the driver of the vehicle essentially does not perceive a change between acquisition areas of different optical cameras. A further object of the present invention is to provide a vehicle having a mirror replacement system which is the viewing system according to the invention.

SUMMARY OF THE INVENTION

The above objects are solved by a method having the features of claim 1, a viewing system having the features of claim 4, and a vehicle having the features of claim 16. Preferred embodiments are given in the dependent claims.

A method according to an embodiment of the present invention switches between a first and a second image area on a display device in a vehicle having a towing vehicle and a trailer pivotally mounted on the towing vehicle. The first image area displayed to a driver on a display device, such as a monitor mounted on the towing vehicle, is obtained, for example, by acquiring and processing first image data by a first image acquisition device of a first acquisition area. The second image area that can be displayed on the display device is extracted from second image data acquired by a second image acquisition device of a second acquisition area. The second image area that can be acquired by the second image acquisition device overlaps with the first image area that can be acquired by the first image acquisition device. The first image acquisition device and the second image acquisition device preferably have different optical properties, such as different aperture angles, distortion curves and/or angular resolutions. The optical properties of the first and second image acquisition devices, which are preferably mounted on a towing vehicle of the vehicle, are preferably such that legal regulations are fulfilled, in particular in Europe, for example, as specified by Rule No. 46 of the United Nations Economic Commission for Europe (UN/ECE (Addendum 45, Revision 6). In this rule, for example, a main mirror (large) (according to ECE-R46 "Main mirror (large) group II") and a wide-angle mirror (according to ECE-R46 "Wide-angle mirror group IV") are provided in addition to other mirrors. The first image acquisition device according to the present invention is, for example, a main camera capable of capturing the Group II field of view defined in the above Rule, and the second image acquisition device according to the present invention is, for example, a wide-angle camera for a wide-angle field of view according to the Group IV field of view defined in UN/ECE-R46. Additionally or alternatively, other fields of view (not required by law or regulation) around the vehicle may be captured and displayed.

With the method of the present invention, the above-mentioned first image area and/or the second image area are displayed in a same display field of a display device. The display device, which is for example an LED display, is preferably designed such that a plurality of image data captured by for example different image acquisition devices can be displayed in the same display field. According to the method of the present invention, either the first image area or the second image area is displayed on the display panel. According to the method of the present invention, the image areas are preferably adapted and/or crossfaded in such a way that the user hardly notices or perceives this switching between the first and the second image area. Due to the fact that in the area between the image area captured by the first camera and the area captured by the second camera the image properties (and the properties of the image acquisition devices) are very similar or the same, the driver notices the switching and/or crossfading only when looking closely when there is a change between the first and the second image in this area. The terms switching or fading in this context include both an "abrupt" switching between the first and second image areas, in which either only the first image area or only the second image area is displayed even at exact temporal resolution, and a "smooth" switching between the first and second image areas, in which at exact temporal resolution the first image area is gradually faded out and faded over by the second image area.

According to the method of the present invention, a pivot angle between the towing vehicle and the trailer is further continuously determined by a pivot angle determination device. The pivot angle determining device is, for example, a processor that acquires rotational speed information of wheels or axles of the towing vehicle and the trailer to calculate a pivot angle therefrom. Determining a pivot angle between a towing vehicle and a trailer is generally known and can also be determined by other techniques, such as detecting the rear edge of the trailer, for example, by image recognition from a captured image. Other pivot angle determination methods are possible, using for example already existing sensors (ABS).

According to the method of the present invention, switching is performed between the display of the first image area and the display of the second image area based on a switching condition. According to one embodiment, this switching condition is, for example, a defined pivot angle between the towing vehicle and the trailer. Switching according to the present invention is performed in such a way that, at the time of switching, the first image data of the first image area correspond to the second image data of the second image area in such a way that the images that can be perceived by a user on the display device on the basis of the first and second image data are almost congruent. In other words, the first and second image areas extracted from the first and second image data are displayed to the driver of the vehicle in such a way that the smallest possible image difference results, in particular with regard to the optical properties of the image, so that an image displayed to the driver before switching is almost congruent with the image displayed after switching.

According to a further development of the method according to the invention, switching is performed between the display of the first image area and the display of the second image area if the currently determined pivot angle is above or below a defined pivot angle. Preferably, the defined pivot angle is within a pivot angle range having a lower pivot angle limit and an upper pivot angle limit, whereby a threshold range can be defined to prevent constant switching between the two image areas for small changes in the current pivot angle around the defined pivot angle. Such a fast switching back and forth between the display of the first image area and the display of the second image area would be perceived by the driver as "flickering" on the display device.

To prevent the above "flickering", the first image acquisition device is preferably activated to display the first image area when the pivot angle reaches the lower limit of the pivot angle range. If the first image acquisition device is already active, i.e. the first image area is displayed, it remains active. If, on the other hand, the second image acquisition device is active, i.e. the second image area is displayed, the system switches to the first image acquisition device. Subsequently, switching from the first image acquisition device to the second image acquisition device takes place when the instantaneous bend angle reaches the defined bend angle.

When the instantaneous pivot angle reaches the pivot angle upper limit, the second image acquisition device is activated. If the second image acquisition device is already active, it remains active. If, on the other hand, the first image acquisition device is active, the system switches to the second image acquisition device. Subsequently, a switchover from the second image acquisition device to the first image acquisition device takes place when the instantaneous bend angle reaches the defined bend angle. An active image acquisition device means that images captured by it are displayed.

If the instantaneous pivot angle reaches the defined pivot angle without having reached the pivot angle lower limit or the pivot angle upper limit beforehand, i.e. since the last switching operation, no switching takes place, which prevents rapid switching back and forth between the display of the first image area and the display of the second image area if the instantaneous pivot angle changes only slightly around the defined pivot angle.

According to a default setting, the first image area is displayed until the instantaneous pivot angle reaches either the defined pivot angle or the upper pivot angle limit. When the vehicle is parked, the current system status is stored, i.e. for example information about the current pivot angle, currently displayed image areas or image information, currently activated display, etc. If, after the vehicle has been parked, wherein the current pivot angle exceeds the defined pivot angle or reaches the upper pivot angle limit, the vehicle is started, then the second image area, for example, is displayed in accordance with the invention if this second image area has been saved before the parking.

The method described above according to the invention for switching between image areas can be used, for example, in a viewing system according to an embodiment of the present invention.

The viewing system according to the embodiment of the present invention is used for a vehicle having a towing vehicle and a trailer pivotally attached to the towing vehicle. According to the embodiment, the viewing system preferably comprises at least one first image acquisition device for capturing first image data of a first acquisition area and at least one second image acquisition device for capturing second image data of a second acquisition area intersecting the first acquisition area, wherein the first and second image acquisition devices have different optical characteristics. As mentioned above, the first image acquisition device is, for example, a main camera and the second image acquisition device is a wide angle camera. The main camera may have, for example, a smaller aperture angle and a higher resolution than the second image acquisition device. The optical characteristics or properties include, for example, angular resolution, aperture angle, and/or distortion.

The first and second image acquisition devices have, for example, an optical image sensor and corresponding optical systems such as lenses.

Where reference is made in this description to fields of view or viewing areas, this refers to corresponding viewing areas as defined in the respective national regulations, for example for Europe in the above-mentioned ECR-R46, preferably those that are prescribed for display in these legal regulations (fields of view).

The viewing system according to the embodiment of the present invention further comprises a device for processing the first and second image data to obtain a first image area from the first image data and a second image area from the second image data. The first and second image areas are such that they provide an almost congruent image.

The viewing system according to the embodiment of the present invention further comprises a display device for displaying the first image area and the second image area, respectively, in a same display field. By displaying the first image area and the second image area in the same display field, the environment of the vehicle can be displayed to the driver in such a way that, depending on certain driving situations, either the image of the first image acquisition device (main camera with high resolution) or the image of the second image acquisition device (wide-angle camera with lower resolution) is displayed.

The viewing system according to the embodiment further comprises a pivot angle determining device for continuously determining a pivot angle between the towing vehicle and the trailer. The pivot angle determination device may, for example, actively determine the pivot angle between the towing vehicle and the trailer independently or receive a signal from an external device containing information about the pivot angle.

The viewing system according to the preferred embodiment further comprises a display switching device for switching between the display of the first image area and the display of the second image area based on a switching condition. The switching condition is, for example, a defined bend angle determined or received by the bend angle determining device. Switching is performed according to the method described above, i.e. preferably in such a way that at the time of switching the first image data of the first image area correspond to the image data of the second image area in such a way that the images that can be perceived by a user on the display device on the basis of the first and second image data are almost congruent. This ensures that the user hardly notices/perceives the switching between the image areas. This is achieved in particular by the fact that in the first and second image areas corresponding image data differ by preferably a maximum of 30 pixels on the display device, which in the case of a display device with a pixel center distance of, for example, 0.18525 mm means a distance of 5.5575 mm. Depending on the display device and/or a distance to a viewer of the display device, the above-mentioned maximum number of pixels may vary.

In the viewing system according to the present embodiment, for example, the distance between the first and second image acquisition devices is preferably in a range of 10 mm to 500 mm, i.e. the image acquisition devices are preferably arranged on the vehicle at a maximum of this distance from one another. It should be noted that the closer the two image acquisition devices are to each other, the easier it is to display images that are as congruent as much as possible to the user at the time of switching between the first and second image areas.

As mentioned above, the first image acquisition area of the first image acquisition device and the second image acquisition area of the second image acquisition device overlap, so that it is possible to display image areas on the display device that have essentially the same image content, but have been captured/acquired with different optical characteristics or properties. According to the preferred embodiment, the first and second image acquisition devices have, for example, different aperture angles, wherein the optical axes in the first and second image acquisition devices are aligned with each other at an alignment angle of preferably 0° to 60° depending on their aperture angles. This makes it possible to capture a correspondingly large area next to the vehicle by using the first and second image acquisition devices.

According to the viewing system of the preferred embodiment, it is possible to suitably determine the angle of alignment of the first and second image acquisition devices, for example by a developer of the viewing system, by displaying a reference point on the display device, wherein this reference point corresponds to the same pixel coordinates/image data in the first and second image areas. Thereby, the image acquisition devices are preferably fixedly adjusted to each other on the vehicle, or alternatively, in the case of movable cameras, also mechanically adjustable by the vehicle user. This means, for example, that the user of the viewing system can select any point, such as the rear area of the trailer, as a reference point, so that the image data of the first and second image areas match as closely as possible at this reference point at the time of switching.

As an alternative to the above-mentioned user-defined setting of the reference point, it is possible that the reference point is predefined or can also be set depending on the trailer height and/or trailer length or other vehicle geometries.

According to the viewing system of the present embodiment, in particular, the reference point is located on a plane perpendicular to the roadway, which passes through a point in the area of the rear edge of the trailer with the defined pivot angle and through the first and second image acquisition devices. This allows, for example, the user of the viewing system to move the reference point to this plane as desired and to define a suitable reference point at which, at the time of switching, the displayed image data is nearly identical. In order to be able to observe the rear edge of the trailer, for example, the reference point is preferably spaced apart from the first or second image acquisition device and set at the defined pivot angle in the area of the rear edge of the trailer.

In order to be able to display as wide an area as possible next to and behind the vehicle or trailer, the optical properties of the first and second image acquisition devices are preferably different in terms of angular resolution, aperture angle and/or distortion.

According to the invention, the second image acquisition device is, for example, not as high-resolution as the first image recording device, or has the same resolution, so that a cost-effective system can be created overall.

In the viewing system according to the preferred embodiment, the defined pivot angle defining the switching condition is defined within a pivot angle range having a lower pivot angle limit and an upper pivot angle limit. As described above with reference to the method according to the invention, this prevents rapid switching between the display of the first image area and the display of the second image area, which the user would perceive as annoying if the instantaneous pivot angle changes only slightly around the defined pivot angle.

According to the viewing system of the present embodiment, it is also possible for the defined pivot angle to change depending on a driving situation within the pivot angle range. In this way, it is possible to determine the optimum pivot angle at which switching between the image areas should take place in response to different driving situations.

According to the invention, there is further provided a vehicle with a mirror replacement system, i.e. a camera/monitor system, which is the viewing system described above.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the following, the invention is described purely by way of example with reference to the accompanying figures, wherein same reference signs indicate same or similar components.

DETAILED DESCRIPTION OF THE EMBODIMENTS

Figure 1:
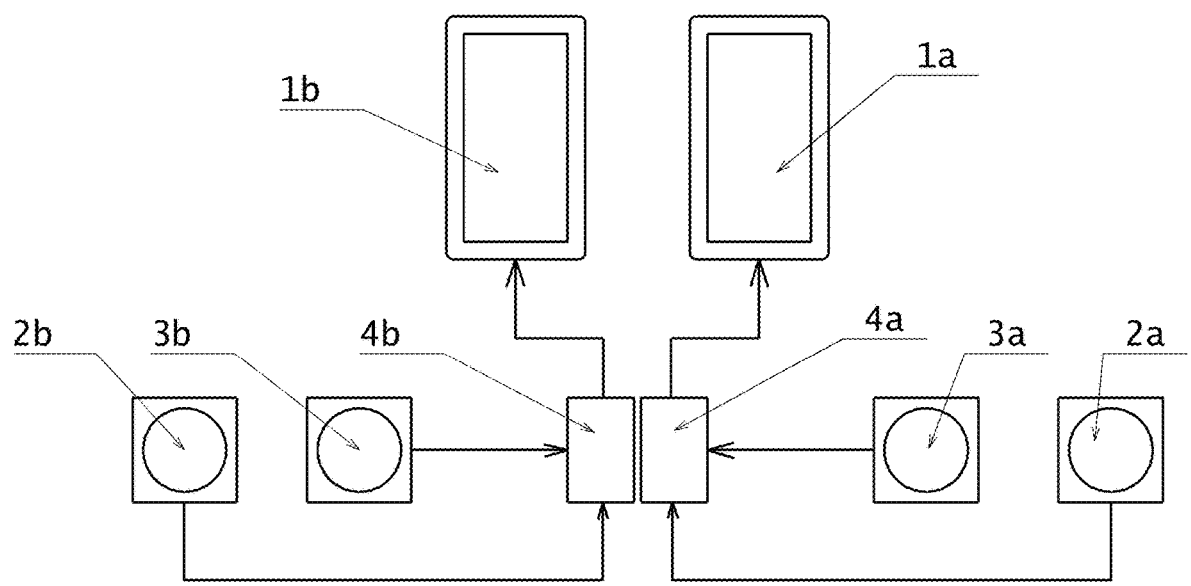
FIG. 1 is a schematic representation of a viewing system according to an embodiment of the present invention.

FIG. 1 shows a viewing system according to one embodiment of the invention comprising display devices 1a, 1b, image acquisition devices 2a, 2b, 3a, 3b and processing devices 4a, 4b.

The image acquisition devices 2a, 3a are preferably arranged on one side of a vehicle, and are connected to the display device 1a via the processing device 4a. The image acquisition devices 2b, 3b are arranged on the opposite side of the vehicle, as shown for example in FIG. 2, and are connected to the display device 1b via the processing device 4b. According to the preferred embodiment, the processing device 4a, 4b comprises a pivot angle determination device, which is not shown in detail, an image data processing device, and a display switching device.

For the sake of simplicity, only the display device 1a, the image acquisition devices 2a, 3a and the processing device 4a are described below. However, the explanations apply analogously to the display device 1b, the image acquisition devices 2b, 3b and the processing device 4b on the opposite side of the vehicle.

As shown in FIG. 1, according to the embodiment, two image acquisition devices 2a, 3a are provided on one side of the vehicle. Any number of further image acquisition devices can be used. According to the embodiment, the image acquisition devices 2a, 3a are spatially spaced from one another preferably in a range between 10 mm and 500 mm. The image acquisition device 2a is, for example, a wide-angle camera with low resolution and the image acquisition device 3a is, for example, a main camera with high resolution. According to the embodiment, the two image acquisition devices have different optical characteristics/properties.

The processing device 4a, which comprises the above-mentioned display switching device (not shown), is adapted to switch between an image captured by the image acquisition device 2a to an image captured by the image acquisition device 3a, each of which is displayed on the display device 1a. In the preferred embodiment, the display device 1a has a single display field/panel for displaying either the image picked up by the image acquisition device 2a or the image picked up by the image acquisition device 3a. The display device 1a may also have multiple display fields/panels on which the same or different images captured by the image acquisition devices 2a, 2b may be displayed. For example, the display device 1a serves as a mirror replacement system for a vehicle.

Figure 2:
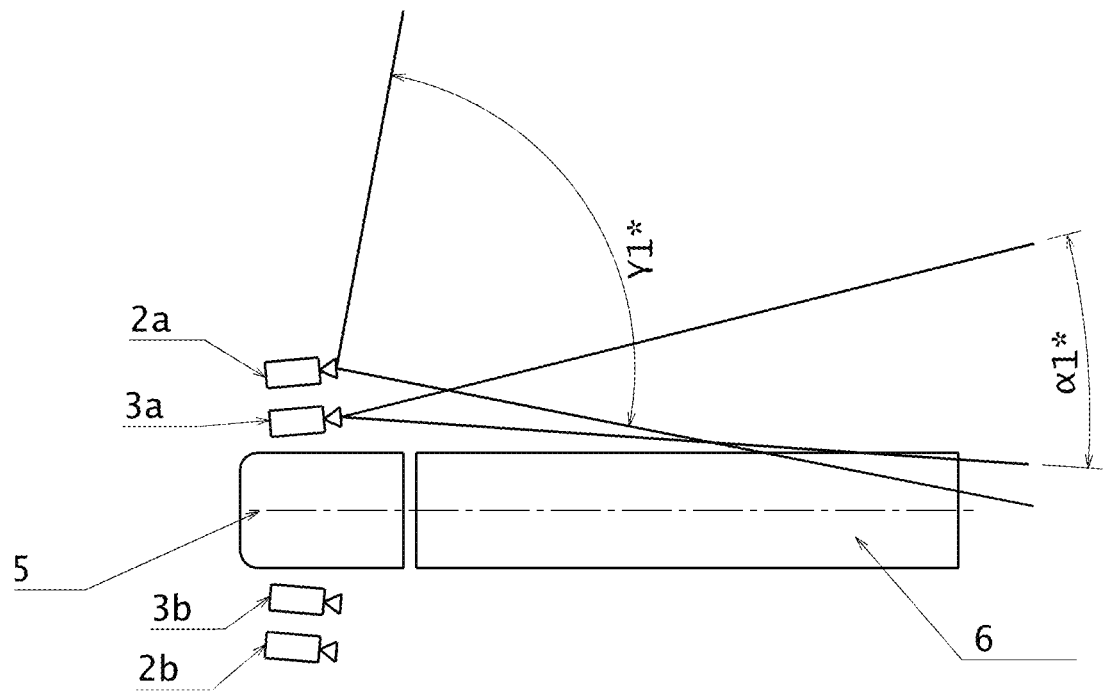
FIG. 2 is a top view of a vehicle using the viewing system shown in FIG. 1.

As shown in FIG. 2, the vehicle comprises, for example, a towing vehicle 5 and a trailer 6 pivotally attached thereto.

The image acquisition device 2a shown in FIG. 1 having a first angle of view α1 is used for acquiring first image data of a first acquisition area, wherein in FIG. 2 the projection α1* of the angle of view can be seen, which spans horizontally, i.e. approximately parallel to a flat road surface. The image acquisition device 3a having a second angle γ1 is used for acquiring second image data of a second acquisition area intersecting the first acquisition area, wherein the projection γ1* of the angle of view is shown in FIG. 2, wherein the first and second image acquisition devices 2a, 3a have different optical characteristics as mentioned above.

Specifically, as shown in FIG. 2, for example, the aperture angle of the image acquisition device 2a is larger than the aperture angle of the image acquisition device 3a. Consequently, the second acquisition area is larger than the first acquisition area. According to the present embodiment, the image acquisition device 3a is a high resolution camera and the image acquisition device 2a is a wide angle camera with lower resolution. FIG. 2 illustrates first and second acquisition areas in a horizontal plane.

Figure 3:
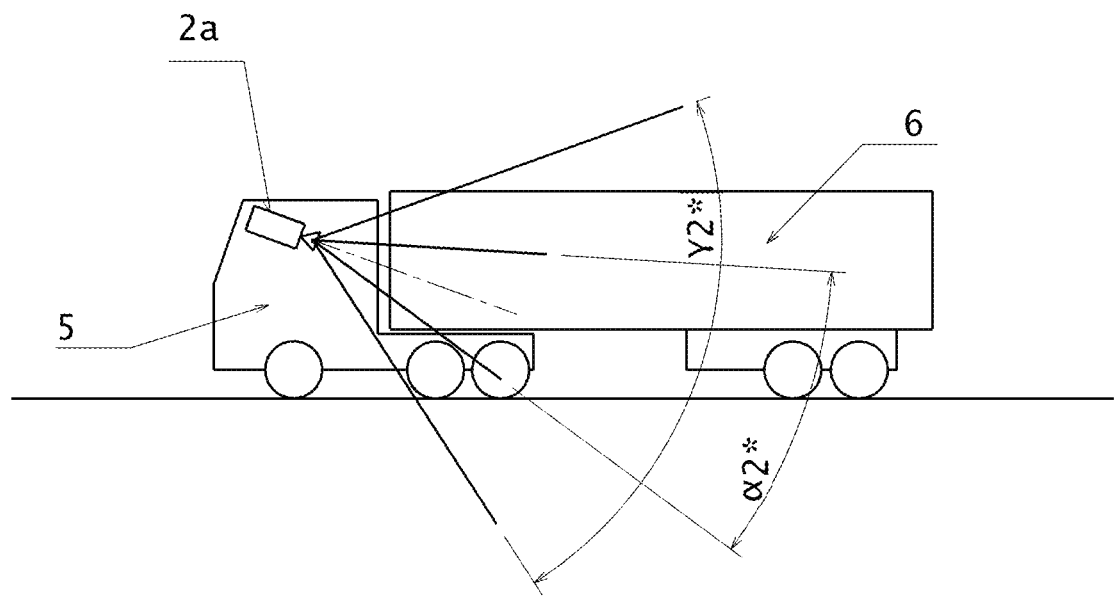
FIG. 3 is a side view of the vehicle shown in FIG. 2.

FIG. 3 shows the vehicle shown in FIG. 2 from the side with corresponding vertical projections γ2*, α2* of the viewing angles of the image acquisition devices 2a, 3a, spanning approximately perpendicular to a plane road surface. In FIG. 3, only the image acquisition device 2a is shown.

As mentioned above, the image acquisition device 3a covers with its acquisition area a field of view corresponding to a "main mirror (large) group II" according to ECE-R46, and the image acquisition device 2a covers with its acquisition area a field of view corresponding to a wide-angle mirror (according to ECE-R46 "wide-angle mirror group IV"). Other suitable defined fields of view can be covered by the image acquisition devices 2a, 3a according to national regulations.

As shown in FIGS. 2 and 3, the image acquisition devices 2a, 3a are arranged in such a way that the respective acquisition areas overlap in the horizontal plane and the acquisition areas overlap in the vertical plane.

The processing device 4a shown in FIG. 1 comprises the display switching device (not shown) which switches between an image area located in the first acquisition area and a corresponding image area located in the second acquisition area when a suitable switching condition is fulfilled, and displays it on the display device 1a. The switching condition is, for example, a pivot angle defined between the towing vehicle 5 and the trailer 6, as described below.

Figure 4:
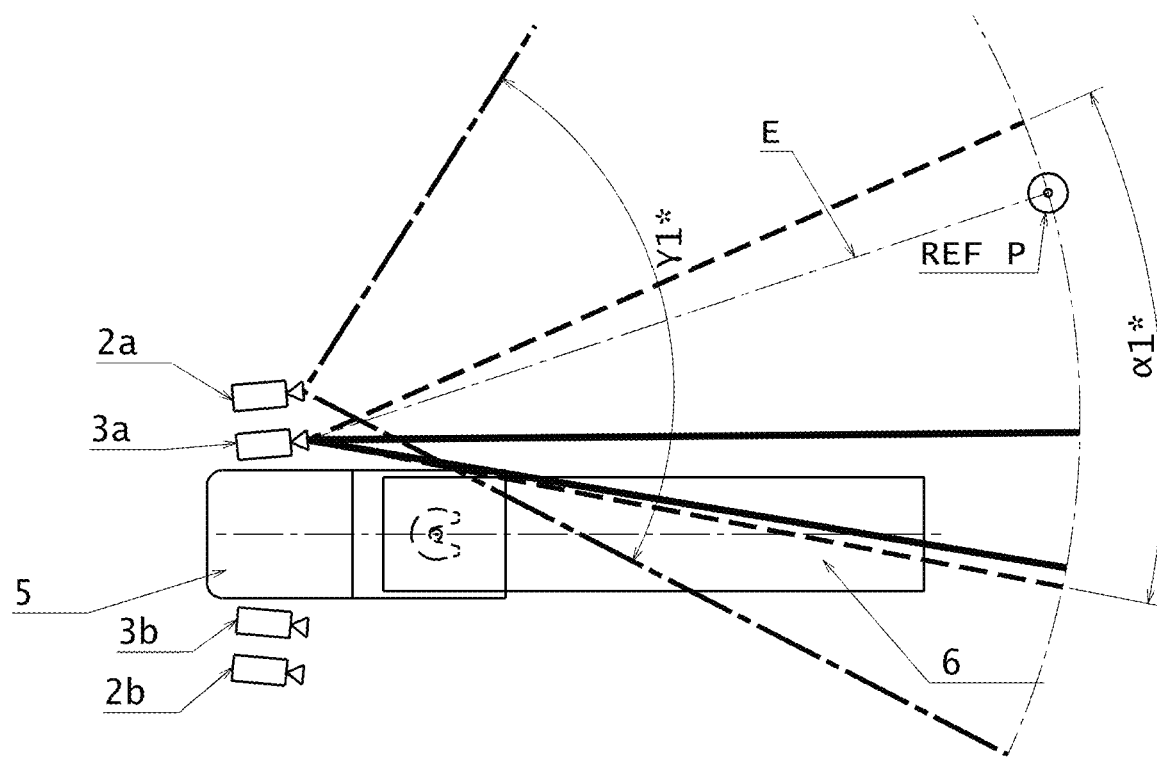
FIG. 4 is a top view of the vehicle comprising the viewing system shown in FIG. 1 according to a first driving condition.

FIG. 4 shows a top view of the vehicle shown in FIGS. 2 and 3 with the towing vehicle 5 and the trailer 6 in a first driving state. The first driving state is specifically such that between the towing vehicle 5 and the trailer 6 the pivot angle is equal to 0°.

Figure 5:
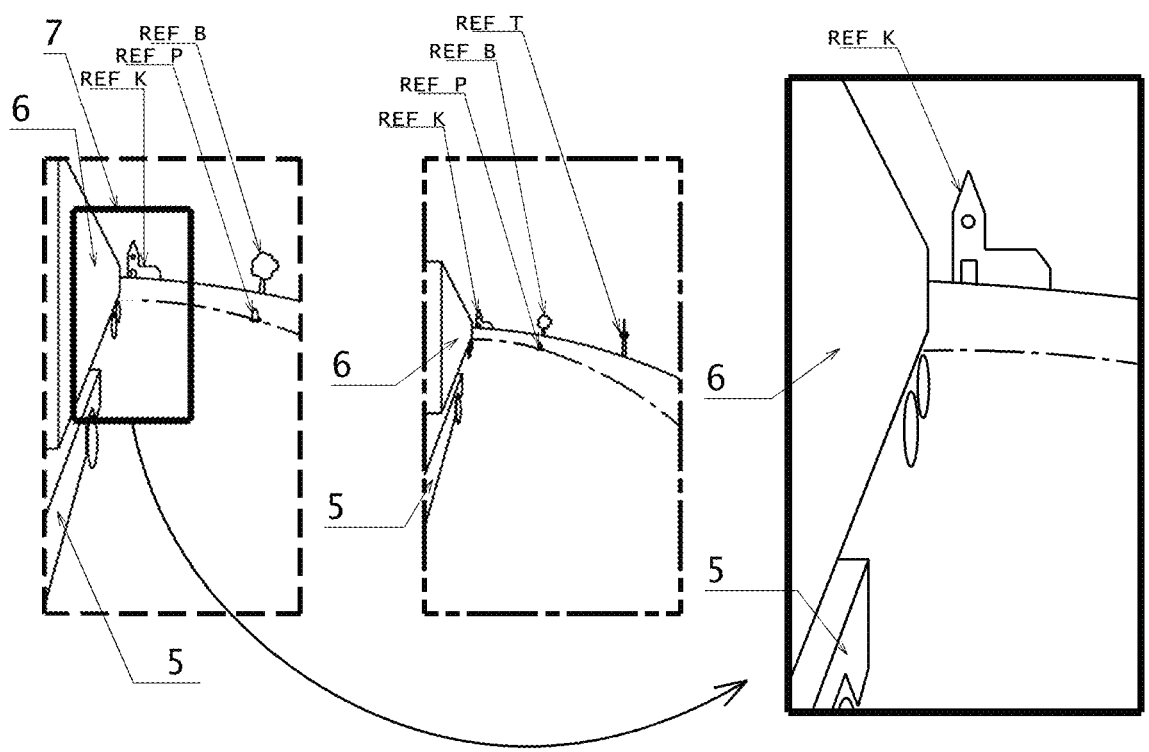
FIG. 5 is a schematic representation of the display of acquisition areas and image areas in the first driving state shown in FIG. 4.

In the first driving state, a first image area 7, as shown in FIG. 5, is displayed to the driver of the vehicle on the display device 3a. The first image area 7 is extracted from the image data of the first acquisition area such that, according to the embodiment, the rear area of the trailer 6 is displayed. FIG. 5 shows, in dashed lines on the left side, the first acquisition area that can be covered by the image acquisition device 3a. According to the present embodiment, in the driving situation shown in FIG. 4, the first image area 7 (outlined area on the left side in FIG. 5) is displayed to the driver of the vehicle on the display device 1a, as shown in FIG. 5 on the right side. The image displayed in this way (right side in FIG. 5) preferably has high resolution.

FIG. 5 further shows, in the center, a second acquisition area displayable by the second image acquisition device 2a. As schematically shown in the figure, the second acquisition area is more wide-angled than the first acquisition area, as shown by the reference points K, P, B and T.

Figure 6:
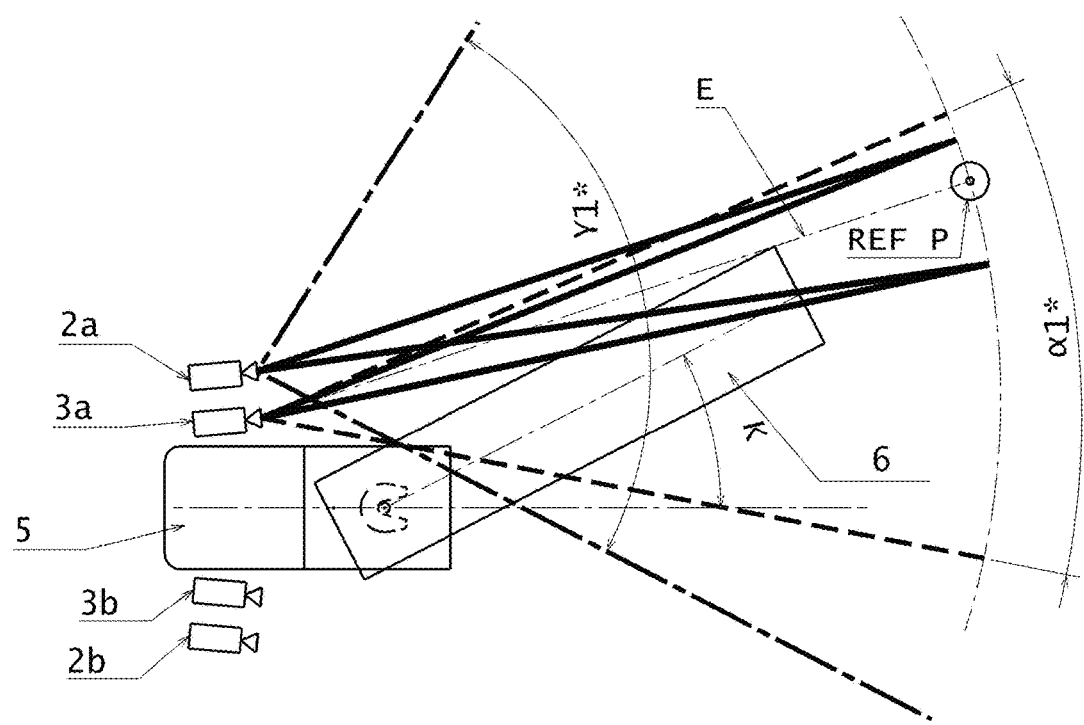
FIG. 6 is a top view of the vehicle comprising the viewing system according to FIG. 1, according to a second driving state.

Referring to FIG. 6, a second driving situation is shown, in which a pivot angle K is formed between the towing vehicle 5 and the trailer 6. According to the present embodiment, the pivot angle K is continuously determined by the above-mentioned pivot angle determining device of the processing device 4a, 4b.

Figure 7:
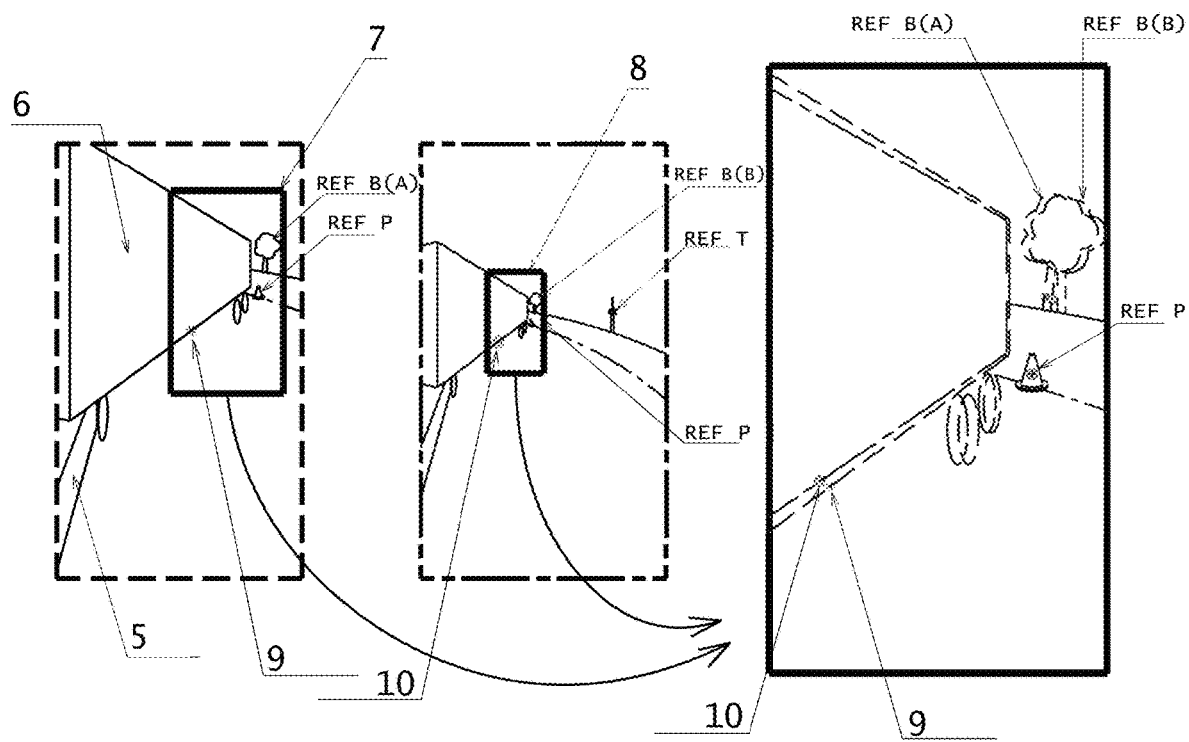
FIG. 7 is a schematic representation of the display of acquisition areas and image areas in the second driving state shown in FIG. 6, at the time of switching.

As can be seen by a comparison of FIGS. 5 and 7, as the pivot angle K increases, the first image area 7 moves with the trailer end (trailer tracking) and reaches in FIG. 7, left side the outer area of the image data of the acquisition area of the first image acquisition device 3a, more precisely the outer area of the sensor, and at the same time the trailer 6 reaches a pivot angle $K_D$ defined in more detail below. In the driving situation shown in FIG. 6, furthermore, as shown in FIG. 7 (center), a second image area 8 can be displayed, which is extracted from the image data acquired by the wide-angle image acquisition device 2a. The first image area 7, shown on the left side in FIG. 7, thus corresponds the second image area 8, shown in the middle of FIG. 7. The first image area 7, as shown in FIG. 7 on the left side, corresponds to a section of the first acquisition area, and the second image area 8, shown in the middle of FIG. 7, corresponds to a section of the second acquisition area, wherein the image data of the first image area 7 and the image data of the second image area 8 correspond to each other in that they appear as the same images to an observer when displayed on the display device. The first and second image areas 7, 8 are thus almost congruent, but have different resolutions.

FIG. 7 specifically shows a switchover point at which the display of the first image area 7 is switched to a display of the second image area 8. In FIG. 7 on the right side, the stylized image contents of the image areas 7 and 8 are shown simultaneously in the line type of their origin acquisition areas (left side and in the center of the figure) for illustration purposes.

FIG. 7 further shows on the left side a point 9 indicating an arbitrary reference point on the trailer 6. FIG. 7 shows in the center a point 10 indicating the same reference point on the trailer 6.

As can be seen on the right side in FIG. 7, at the time of switching or fading, these two reference points 9, 10, are essentially at the same location. The displacement of the two points 9, 10 depends essentially on the distance and orientation angle of the image acquisition devices from and to each other, respectively, as well as on the optical properties of the image acquisition devices, such as distortion, aperture angle, and angular resolution.

FIG. 6 further shows a reference point P which, according to the embodiment, lies on a plane E passing through a point in a region of the rear edge of the trailer 6 and through the first image acquisition device 3a. This reference point P is also shown in FIG. 7 on the left side and in the center and is included in the respective image areas 7, 8. The respective orientation angles of the first and second image acquisition devices 2a, 3a are determined by the reference point P displayed on the display device, which corresponds to the same pixel coordinates in the first and second image areas 7, 8.

As shown in FIG. 7 right side, the display of the first image area 7 is switched to the display of the second image area 8 at the time of switching in such a way that the images perceived by the user are almost congruent. Specifically, corresponding image data in the first and second image areas 7, 8 differ by, for example, a maximum of 30 pixels on the display to provide such an impression or perception for the user. In FIG. 7 right side, for example, the above-mentioned reference points 9 and 10 are spaced apart by a certain number of pixels. At the reference point P, the corresponding pixels of the first and second image areas are almost identical, wherein the distance between corresponding pixels of the first and second image areas increases as the distance from the reference point P increases.

Figure 8:
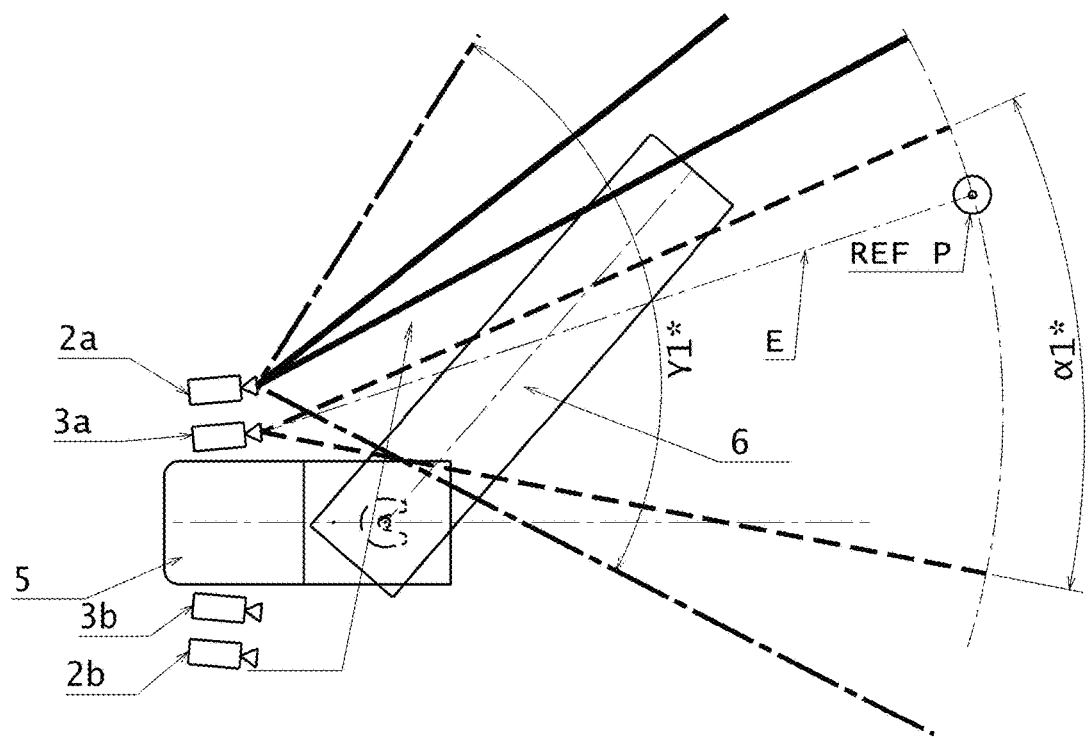
FIG. 8 is a top view of the vehicle comprising the viewing system according to FIG. 1, according to a third driving state.
Figure 9:
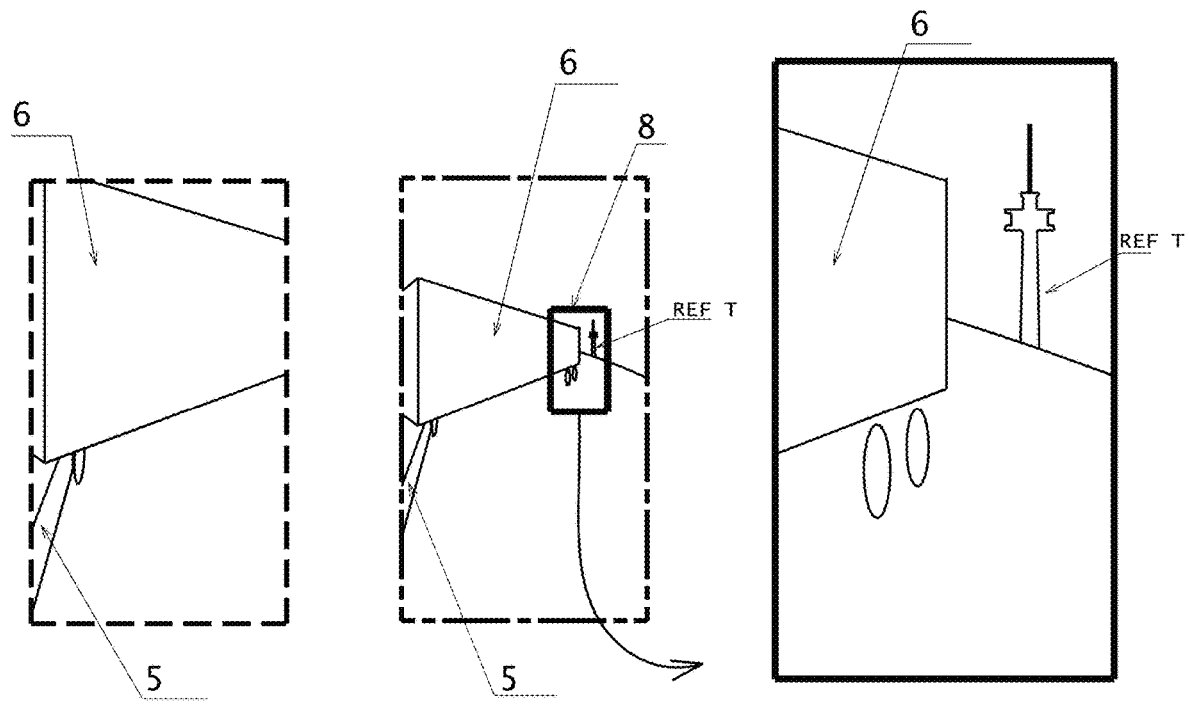
FIG. 9 is a schematic representation of the display of acquisition areas and image areas in the third driving state shown in FIG. 8, after a switchover time.

FIG. 8 shows a third driving situation in which, compared to FIG. 6, the pivot angle between the towing vehicle 5 and the trailer 6 has further increased. As shown in FIG. 9, in this driving situation, the second image area 8 of the wide-angle image acquisition device 2a, which was switched to in FIG. 7, is displayed. As shown in FIG. 9 on the left side, the first image acquisition device 3a can no longer acquire the rear edge of the trailer 6, since the rear edge of the trailer 6 is outside the first acquisition area.

Thus, FIG. 9 shows on the right side to the user of the viewing system a display of the second image area 8 of the wide-angle image acquisition device 2a, switched from the display of the first image area 7 of the high-resolution image acquisition device 3a, as shown in FIGS. 5 and 7. The switching timing is determined depending on a switching condition defined by the pivot angle according to the preferred embodiment.

Figure 10:
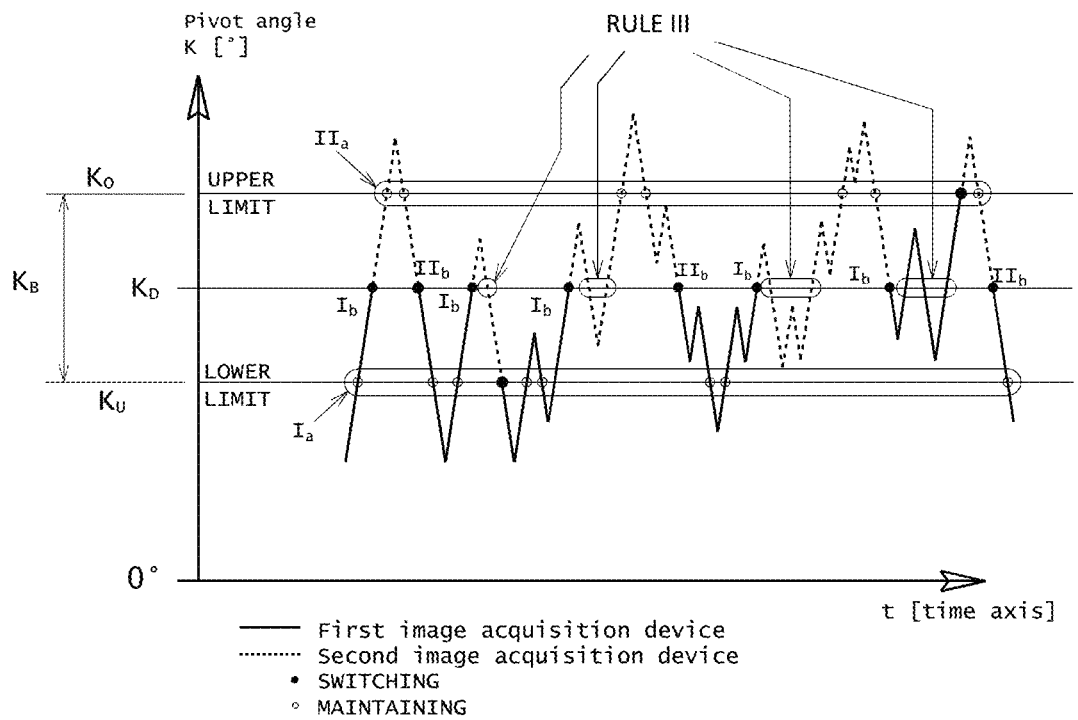
FIG. 10 is a diagram illustrating the switching of the display according to a preferred embodiment of the invention.
Figure 11:
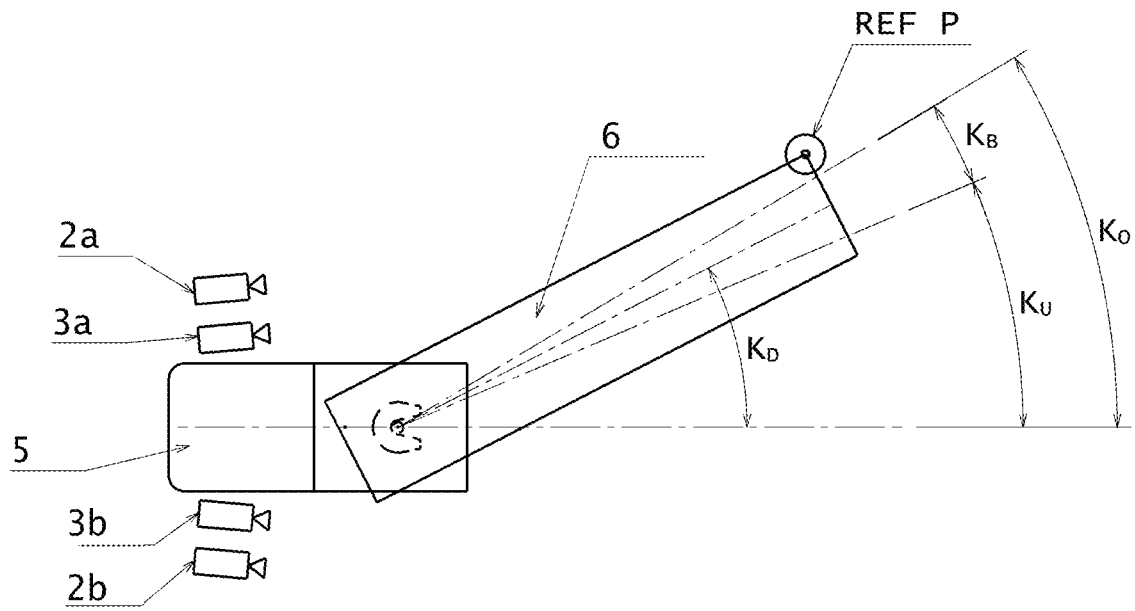
FIG. 11 is a top view of a vehicle comprising the viewing system according to FIG. 1 for illustrating the switching method shown in FIG. 10.

With reference to FIGS. 10 and 11, a method is described in which the switchover condition depends on the pivot angle between the towing vehicle and the trailer.

According to the embodiment, the switching condition specifically depends on a defined pivot angle $K_D$, which is in a predetermined pivot angle range $K_B$ with a lower pivot angle limit $K_U$ and an upper pivot angle limit $K_O$, as shown in FIGS. 10 and 11.

In FIG. 10, the solid line indicates activation of the first image acquisition device, the dotted line indicates activation of the second image acquisition device, the black dot indicates switching between both image acquisition devices, and the circle indicates maintaining the current activation state of an image acquisition device.

As shown in FIG. 10, when the instantaneous pivot angle between the towing vehicle 5 and the trailer 6 reaches the lower pivot angle limit $K_U$, the first image acquisition device 2a is activated and the first image area 7 is displayed on the display device, as shown in FIG. 5. When, as shown in FIG. 10, the instantaneous pivot angle then reaches the defined pivot angle $K_D$ for the first time, the second image acquisition device is switched to and the second image area 8 is displayed on the display device, as shown in FIG. 9. This switching point is illustrated in FIG. 7, as described above.

When the instantaneous pivot angle reaches the upper pivot angle limit $K_O$, as shown in FIG. 10, and then again the defined pivot angle $K_D$, it is again switched to the first image acquisition device.

As shown in FIG. 10, switching between the first and second image acquisition device only occurs when the defined pivot angle $K_D$ is reached and the lower or upper pivot angle limit has been reached at least once before. In this way, rapid successive switching between the first image acquisition device and the second image acquisition device is prevented.

In FIG. 10, the switching between the activation of the image acquisition devices is summarized by the following rules:

Rule Ia: "When the pivot angle reaches the lower pivot angle limit $K_U$, the first image acquisition device is activated, (if this is already active, it remains active, if the second image acquisition device is active, it is switched to the first image acquisition device)";

Rule Ib: "Subsequent switching from the first image acquisition device to the second image acquisition device when the defined pivot angle $K_D$ is reached";

Rule IIa: "When the pivot angle reaches the upper pivot angle limit $K_O$, the second image acquisition device is activated, (if the second image acquisition device is already active, it remains active, if the first image acquisition device is active, it is switched to the second image acquisition device)";

Rule IIb: "Subsequent switching from the second image acquisition device to the first image acquisition device when the defined pivot angle $K_D$ is reached"; and Rule III: "If the pivot angle reaches the defined pivot angle $K_D$ without first having reached the lower pivot angle limit $K_U$ or the upper pivot angle limit $K_O$, no switching takes place".

Figure 12:
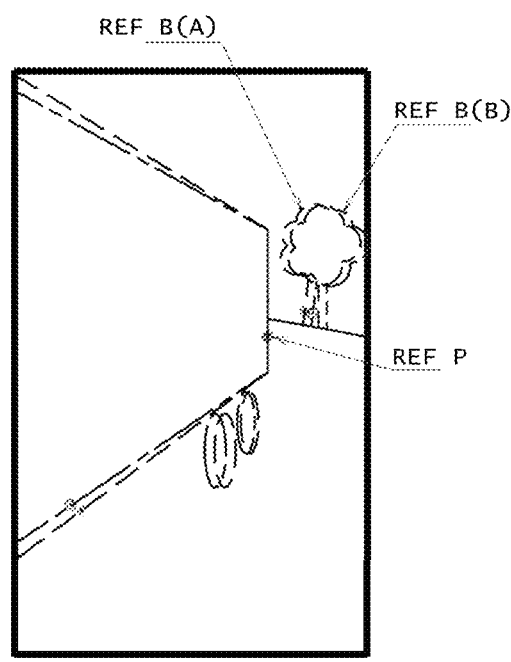
FIG. 12 is a further illustration of the display of acquisition areas and image areas, similar to FIG. 7 at the time of switching.

FIGS. 11 and 12 further show a reference point P selected to be provided at the rear edge of the trailer 6. For example, according to the embodiment, the reference point P is displayed on the display device to the user or the driver. He can freely choose the reference point P and place it, for example, as shown in FIG. 11, at the rear edge of the trailer 6. As shown in FIG. 12, when switching from the first image area to the second image area as described above, the edge of the trailer 6 in particular is displayed almost identically between the first image area and the second image area, so that the user can perceive almost no difference or pixel displacement between the first image area and the second image area at the reference point.

In this way, the user can select a suitable area which is to be displayed as "congruently" as possible at the time of switching.

Figure 13:
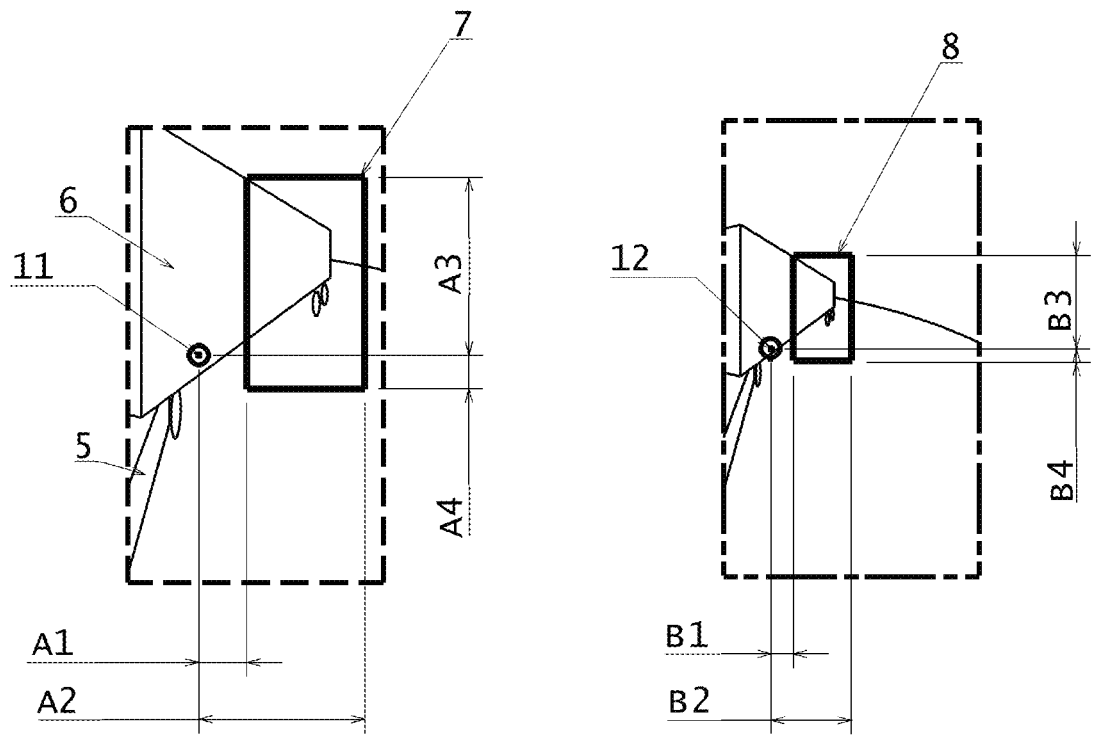
FIG. 13 is an exemplary representation to illustrate the mapping of the first and second image areas with different distortion curves.
Figure 13:
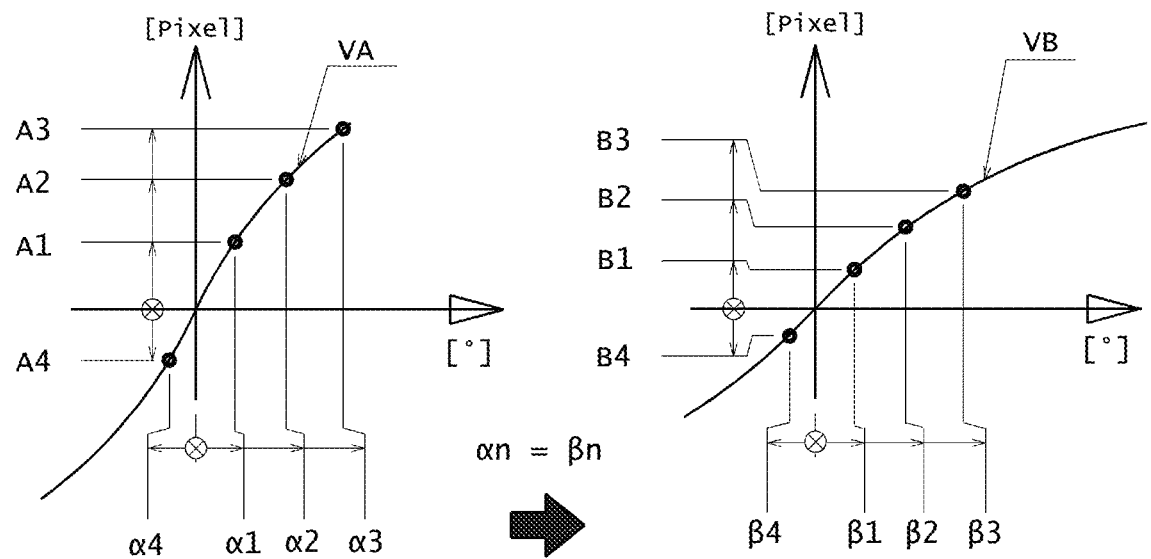

FIG. 13 shows an exemplary method for mapping the first image area 7 and the second image area 8 onto each other in such a way that an almost congruent image (smallest possible image difference) is produced.

As mentioned above, according to the embodiment, the first imaging area, as shown in the upper left of FIG. 13, is captured by the high-resolution image acquisition device, whereas the second imaging area, as shown in the upper right of FIG. 13, is captured by a wide-angle image acquisition device. The respective distances A1 to A4 correspond to the distances of the respective edges of the first image area 7 shown rectangular in the figure to the optical axis 9 of the image acquisition device 3a. Correspondingly, B1 to B4 in the upper right corner of FIG. 13 indicate the respective distances of the edges of the rectangular second image area 8 from the optical axis 10 of the second image acquisition device 2a.

Since, as described above, according to the preferred embodiment the two image acquisition devices have different optical properties, for example different distortion curves, as shown in FIG. 13, the first image area 7 and the second image area 8 can be imaged onto each other according to the distortion curves shown in FIG. 13 by way of example in such a way that essentially congruent images can be perceived.

The distortion curves of the image acquisition devices shown in FIG. 13 are merely exemplary. By using suitable distortion curves, it is possible, for example, to achieve a very high resolution where it is needed or required, i.e. in the highly relevant area of the vehicle environment that lies within the detected sub-area of the vehicle environment.

Figure 14:
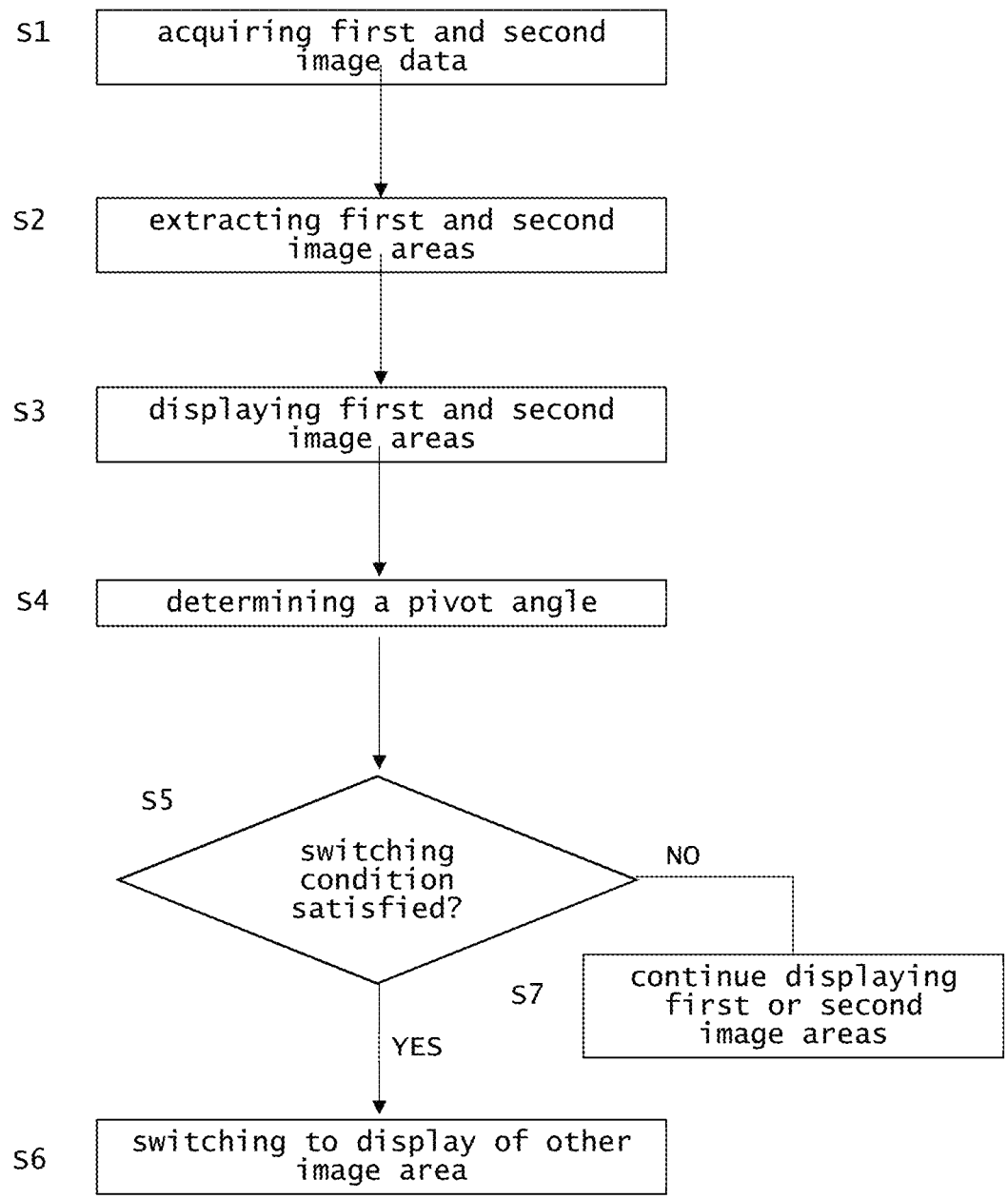
FIG. 14 a simplified schematic representation of the method according to an embodiment of the invention.

FIG. 14 shows in a very simplified way the above described method according to an embodiment for illustrating the switching between the display of two corresponding image areas depending on a pivot angle between a towing vehicle and a trailer.

In step S1, first and second image data are acquired from image acquisition devices having different optical characteristics, different acquisition areas, and covering different viewing areas, as described above. In step S2, first and second image areas, which correspond to each other in terms of image information, are extracted from the acquired image data, as described above. In step S3, the first or the second image area is displayed on the display, as described above, either on a same display field or on different display field separated from each other. For example, a high-resolution image can be displayed on one display field and a wide-angle image can be displayed on a display field next to it. According to the preferred embodiment, the corresponding first and second image areas are displayed or crossfaded on the same display field, as described above. In step S4, the pivot angle is determined, as described above. In step S5, it is determined whether a switching condition based on the pivot angle, as described above, is satisfied. If the condition is satisfied, switching is performed in step S6 to display the image area that was not previously displayed. If the condition is not satisfied, in step S7 the display of the previously displayed image area is continued.

It is explicitly emphasized that all features disclosed in the description and/or claims are to be regarded as separate and independent from each other for the purpose of the original disclosure as well as for the purpose of limiting the claimed invention independently of the combinations of features in the embodiments and/or claims. It is explicitly stated that all range indications or indications of groups of units disclose any possible intermediate value or subgroup of units for the purpose of the original disclosure as well as for the purpose of limiting the claimed invention, in particular also as a limit of a range indication.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method of switching between first and second image areas on a display device in a vehicle having a towing vehicle and a trailer pivotally mounted on the towing vehicle, comprising:
    acquiring first image data by a first image acquisition device of a first acquisition area;
    acquiring second image data by a second image acquisition device of a second acquisition area overlapping the first acquisition area, the first and second image acquisition devices having different optical characteristics;
    processing the first and second image data to extract the first image area from the first image data and to extract the second image area from the second image data;
    displaying the first image area and/or the second image area in a same display field of the display device;
    continuously determining a pivot angle between the towing vehicle and the trailer by a pivot angle determining device;
    switching or cross-fading the display of the first image area and the display of the second image area based on a switching condition determined by a defined pivot angle $K_D$, wherein at the switching time the first image data of the first image area correspond to the image data of the second image area such that the images perceptible by a user on the display device on the basis of the first and second image data, respectively, are nearly congruent.

2. The method according to claim 1, wherein the switching is performed when an instantaneously determined pivot angle is above or below the defined pivot angle $K_D$.

3. The method according to claim 1, wherein the defined pivot angle $K_D$ is within a pivot angle range $K_B$ having a lower pivot angle limit $K_U$ and an upper pivot angle limit $K_O$, and the switching or crossfading is performed:
    when the display of the first image area is activated, switching to an activation of the display of the second image area when the pivot angle reaches the defined pivot angle $K_D$ and has reached the lower pivot angle limit $K_U$ at least once since the last switching; and
    when the display of the second image area is activated, switching to an activation of the display of the first image area if the pivot angle reaches the defined pivot angle $K_D$ and has reached the upper pivot angle limit $K_O$ at least once since the last switching.

4. The method according to claim 1, wherein a default setting is such that the first image area is displayed until the pivot angle reaches either the defined pivot angle $K_D$ or the upper pivot angle limit $K_O$.

5. A viewing system for a vehicle having a towing vehicle and a trailer pivotally mounted on the towing vehicle, comprising:
    at least one first image acquisition device for acquiring first image data of a first acquisition area;
    at least one second image acquisition device for acquiring second image data of a second acquisition area overlapping the first acquisition area, the first and second image acquisition devices having different optical characteristics; and
    means for processing the first and second image data to extract a first image area from the first image data and to extract a second image area (8) from the second image data;
    a display device for displaying at least one of the first image area and the second image area in a same display field of the display device;
    a pivot angle determining device or method for continuously determining a pivot angle between the towing vehicle and the trailer; and
    a display switching device for switching or cross-fading the display of the first image area and the display of the second image area based on a switching condition determined by a defined pivot angle $K_D$, wherein at the switching time the first image data of the first image area correspond to the image data of the second image area such that the images perceptible by a user on the display device on the basis of the first and second image data, respectively, are nearly congruent.

6. The system according to claim 5, wherein image data corresponding to the first and second image areas differ by max. 30 pixels each on the display of the display device.

7. The system according to claim 5, wherein the distance between the first and second image acquisition devices is preferably in a range between 10 mm and 500 mm.

8. The system according to claim 5, wherein the optical axes of the first and second image acquisition devices are aligned with respect to one another at an alignment angle of 0° to 60° depending on their aperture angles.

9. The system according to claim 8, wherein the respective alignment angle of the first and second image acquisition devices is determined by a reference point (P) displayed on the display device corresponding to equal pixel coordinates/image data in the first and second image areas.

10. The system according to claim 9, wherein the reference point (P) is predefined or adjustable depending on trailer height and/or trailer length.

11. The system according to claim 10, wherein the reference point (P) is located on a plane (E) perpendicular to a roadway and passing through a point in an area of the rear edge of the trailer at the defined pivot angle $K_D$ and through the first or second image acquisition device.

12. The system according to claim 11, wherein the reference point (P) is spaced from the first or second image acquisition device and lies in the area of the rear edge of the trailer at the defined pivot angle $K_D$.

13. The system according to claim 5, wherein the optical characteristics of the first and second image acquisition devices have different angular resolutions, aperture angles and/or distortions.

14. The system according to claim 5, wherein the defined pivot angle $K_D$ lies in a pivot angle range $K_B$ having a lower pivot angle limit $K_U$ and an upper pivot angle limit $K_O$.

15. The system according to claim 14, wherein the defined pivot angle $K_D$ changes depending on a driving situation of the vehicle within the pivot angle range $K_B$.

16. The system according to claim 5, wherein the display switching device is adapted to control switching between the first and second image areas and performs a method of:
- acquiring first image data by a first image acquisition device of a first acquisition area;
- acquiring second image data by a second image acquisition device of a second acquisition area overlapping the first acquisition area, the first and second image acquisition devices having different optical characteristics;
- processing the first and second image data to extract the first image area from the first image data and to extract the second image area from the second image data;
- displaying the first image area and/or the second image area in a same display field of the display device;
- continuously determining a pivot angle between the towing vehicle and the trailer by a pivot angle determining device; and
- switching or cross-fading the display of the first image area and the display of the second image area based on a switching condition determined by a defined pivot angle $K_D$, wherein at the switching time the first image data of the first image area correspond to the image data of the second image area such that the images perceptible by a user on the display device on the basis of the first and second image data, respectively, are nearly congruent.

17. A vehicle comprising a mirror replacement system which is a viewing system according to claim 5.

\* \* \* \* \*